| United States Patent [19] | [11] Patent Number: 4,808,687 |
| Burns | [45] Date of Patent: Feb. 28, 1989 |

[54] NOVEL ORGANOPOLYSILOXANES DERIVED FROM BIS-SILYL SUBSTITUTED HETEROCYCLIC COMPOUNDS

[75] Inventor: Stephanie A. Burns, Midland, Mich.

[73] Assignee: Dow Corning Corporation, Midland, Mich.

[21] Appl. No.: 140,710

[22] Filed: Jan. 4, 1988

[51] Int. Cl.$^4$ .............................................. C08G 71/22
[52] U.S. Cl. ...................................... 528/30; 528/33; 548/406; 549/4; 549/83
[58] Field of Search ................... 528/30, 33; 548/406; 549/4, 83

[56] References Cited

U.S. PATENT DOCUMENTS

| 2,640,833 | 6/1953 | DiGiorgia . | |
| 2,645,644 | 7/1953 | DiGiorgio . | |
| 2,803,633 | 8/1957 | Sommer . | |
| 2,845,435 | 7/1958 | Frisch et al. | 260/313 |
| 3,068,241 | 12/1962 | Sargent . | |

OTHER PUBLICATIONS

Article, (Dokl. Akad. Nauk SSSR, vol. 216, No. 5, pp. 1062–1065, V. A. Kuznetsov et al., (No Date Available).

Article, Organosilicon Compounds Having Phenylene and Thienylene Chains, T. I. Tschernyschewa et al., Plaste und Kaut. (1963), 10(7) 390.

*Primary Examiner*—Melvyn I. Marquis
*Attorney, Agent, or Firm*—Robert Spector

[57] ABSTRACT

The organopolysiloxanes of this invention comprise repeating units consisting essentially of a five-membered ethylenically unsaturated heterocyclic ring containing a diorganosiloxane group bonded to the two cyclic carbon atoms adjacent to the hetero atom, which can be nitrogen, oxygen or sulfur. This invention encompasses homopolymers of said repeating units and copolymers comprising said units and diorganosiloxane units such as dimethylsiloxane. The present polymers are characterized by their high resistance to thermally induced degradation, and do not exhibit a significant weight loss at temperatures up to 300 degrees C.

12 Claims, No Drawings

NOVEL ORGANOPOLYSILOXANES DERIVED FROM BIS-SILYL SUBSTITUTED HETEROCYCLIC COMPOUNDS

BACKGROUND OF THE INVENTION

1. Field of the Invention

This invention relates to novel organopolysiloxanes. More particularly, this invention relates to organopolysiloxanes prepared by the polymerization of certain disilyl substituted heterocyclic organic compounds wherein the silicon atoms are bonded to two carbon atoms of a 5-membered, ethylenically unsaturated heterocyclic ring containing oxygen, nitrogen or sulfur as the hetero atom.

2. Description of the Prior Art

Thiophenes and pyrroles wherein at least one of the cyclic carbon atoms is bonded to a silicon atom are reported in the literature.

U.S. Pat. No. 2,845,435, which issued to Frisch and Kary on July 29, 1958, discloses pyrrylsilanes of the general Formula 1.

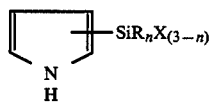  (1)

where R represents an aliphatic, aromatic or alicyclic hydrocarbon radical, n is 1, 2 or 3 and X represents a halogen atom. The compounds are prepared by reacting pyrrylmagnesium bromide with a halosilane such as methyltrichlorosilane.

Example IV of this patent describes the polymerization of 2-pyrrylmethyldichlorosilane to yield a polymer having pendant pyrryl groups along the siloxane chain as represented by formula 2.

  (2)

where Py represents the 2-pyrryl group.

Silyl-substituted thiophenes of the general formula

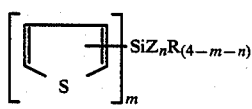  (3)

where R represents a monovalent hydrocarbon radical, Z represents a hydrolyzable group and m and n represent the integer 1 or 2 are disclosed in U.S. Pat. No. 2,640,833, which issued to DiGiorgio on June 2, 1953. It will be apparent to those skilled in the art that compounds containing two hydrolyzable groups represented by Z can be condensed to yield diorganopolysiloxanes analogous to the pyrryl-substituted polymers represented by Formula 3. In this instance Py would represent a 2-thiophenyl group.

The nuclear magnetic resonance spectrum of 2,5-bis(-dimethylhydroxysilyl)thiophene was investigated by V. A. Kuznetsov and coworkers and the results reported in the literature [Dokl. Akad. Nauk SSSR, volume 26, No. 5, pp. 1062–5]. No reactions or polymerization of this compound are disclosed.

The synthesis and platinum-catalyzed polymerization of 2-dimethylhydrosilyl-5-dimethylvinylsilylthiophene is reported by Tschernyschewa et al [Plaste Kausch. 10(7) 390 (1963)].

An objective of the present invention is to provide a novel class of organopolysiloxanes wherein at least a portion of the siloxane units contain a heterocyclic ring wherein two of the cyclic carbon atoms are bonded to silicon. A second objective of this invention is to provide a class of organopolysiloxanes exhibiting a resistance to degradation at temperatures of 300° C. and above.

SUMMARY OF THE INVENTION

The organopolysiloxanes of this invention comprise repeating units consisting essentially of a five-membered ethylenically unsaturated heterocyclic ring containing an organosiloxy group bonded to the two cyclic carbon atoms adjacent to the hetero atom, which can be nitrogen, oxygen or sulfur.

DETAILED DESCRIPTION OF THE INVENTION

This invention relates to organopolysiloxanes comprising repeating units of the formula

  (4)

where each of the substituents represented by R is individually selected from hydrocarbyl and halogenated hydrocarbyl, and Q represents 2,5-furyldiyl or 2,5-pyrrylidyl.

In preferred embodiments of the present polymers one of the two R radicals bonded to each of the silicon atoms is methyl or phenyl and the second R radical is methyl, phenyl or 3,3,3-trifluoropropyl.

This invention also relates to furans and pyrroles corresponding to the general formula

  (5)

where Q′ represents 2,5-furyldiyl or 2,5-pyrrylidyl and R is as defined hereinbefore.

The inventive feature of the present polymers is the presence of heterocyclic, five-membered ethylenically unsaturated ring structures that are linked by a disiloxane group of the formula

  (6)

wherein each of the two silicon atoms are bonded to a cyclic carbon atom immediately adjacent to the hetero atom of the aforementioned ring structure.

In contrast to the organopolysiloxanes disclosed in the aforementioned Frisch and Cary patent, which are bonded to only one silicon atom and are present as a pendant group, the heterocyclic ring of the present 2,5-bis(hydroxysilyl)substituted compounds is incorporated into the linear portion of the present polymers.

The organopolysiloxanes of this invention differ from those described in the aforementioned Kuznetsov article by nature of the silicon-containing linking group, which is a disoloxane group in the present polymers and a silhydrocarbylene group ($-SiC_nH_{2n}Si-$) in the polymers of the Kuznetsov article.

The group represented by Q in the foregoing formula is

(7)

where Y represents oxygen or $=NR'$ and $R'$ is hydrogen or is selected from the same group as R.

The polymers of this invention include both homopolymers wherein substantially all of the repeating units correspond to the foregoing Formula 4

(4)

and copolymers wherein these units represent a portion of the repeating units in the polymer. These units preferably constitute at least 50 mole percent of the repeating units to achieve the highest resistance to degradation at temperatures above 300 degrees C.

The number of repeating units in the polymer molecules together with the types of hydrocarbon radicals represented by R, will determine the viscosity of the curable organopolysiloxane, which can range from a flowable liquid at room temperature to a gum characterized by a viscosity of 10,000 Pa.s or higher at 25 degrees C. When all of the R radicals are methyl, the weight average molecular weights of the polymers are typically from 70,000 to about 90,000 as determined by gel permeation chromatography.

If it is desired to improve the solvent resistance of the present polymers, at least a portion of the hydrocarbon radicals represented by R are preferably 3,3,3-trifluoropropyl.

The terminal units of the present organopolysiloxanes will be determined by the reaction used to cure the polymers. If the organopolysiloxane is not intended to be cured or is to be cured using a non-vinyl specific peroxide such as 2,4-dichlorobenzoyl peroxide the terminal units can be $-SiR'_3$, where each $R'$ individually represents a hydrocarbon radical selected from the same group as R. Alternatively, one of the $R'$ radicals can represent a 5-membered heterocyclic ring wherein the hetero atom is oxygen or nitrogen.

The present hydroxyl-terminated organopolysiloxanes can be cured by a silanol condensation reaction or by reacting the organopolysiloxane with any of the functionally substituted silanes used as curing agents in moisture curable organosiloxane compositions. The substituents that can be present on the silane include but are not necessarily limited to alkoxy, ketoximo and amido groups. The hydroxyl-terminated organopolysiloxanes can also be cured by reaction with an organosilicon compound containing at least two silicon-bonded hydrogen atoms per molecule in the presence of a platinum-containing catalyst. These curing methods are well known, and do not form part of this invention.

The present organopolysiloxanes can be prepared by condensation of the silanol groups is a 2,5-bis(dihydrocarbylhyroxysilyl)-substituted furan or pyrrol. The silyl groups are of the formula $-SiR_2OH$, where R represents a hydrocarbyl or halohydrocarbyl radical as defined hereinabove. The condensation reaction is conducted under the same conditions used for other organosiloxanes containing silanol or alkoxy groups.

In a typical condensation a silanol-substituted organosilicon compound is heated in the presence of a suitable condensation catalyst. Lewis acids such as mineral acids and organosulfonic acids, Lewis bases such as the alkali metal hydroxides and silanolates and Group II metal carboxylates such as zinc octoate have been shown to be effective silanol condensation catalysts.

The molecular weight of the polymer can be controlled by including a monofunctional silanol compound or a hydrolyzable precursor of such a compound in the polymerization reaction mixture. Compounds of this type include triorganohydroxysilanes such a triphenylsilanol, hexaorganodisiloxanes such as hexamethyldisiloxane and triorganohalosilanes such as trimethylchlorosilane.

In one embodiment of the present organopolysiloxanes the terminal silicon atoms are bonded to a furan or pyrrole ring by means of one of the carbon atoms adjacent to the hetero atom. An advantage of such a heterocyclic terminal group is the ability to control the molecular weight of the polymer while allowing it to be subsequently modified with a variety of compounds, including organometallic compounds, that react with heterocyclic organic compounds. These modifications include formation of block copolymers through anionic polymerization of organic or organosilicon compounds in the presence of the anion formed by reacting one of the present polymers containing a heterocyclic terminal group with an organolithium compound such as butyllithium.

Copolymers containing the bis-diorganosilyl-substituted heterocyclic units corresponding to Formula 4 can be prepared by condensing mixtures comprising at least one 2,5-bis(diorganohydroxysilyl)furan, or pyrrole with at least one diorganopolysiloxane such as a dimethylpolysiloxane. Depending upon the desired molecular weight of the final polymer, the initial diorganopolysiloxane can be a liquid or a solubilized gum. A preferred method for preparing copolymers is described in the accompanying examples.

The hydrocarbon radicals present on the diorganopolysiloxane used as a comonomer will influence the chemical and physical properties of the resultant copolymer. For example, if the copolymer is to retain physical properties at temperatures below about 10° C., the diorganopolysiloxane should include phenylmethylsiloxane or diphenylsiloxane units. Fluorinated siloxane units such as methyl-3,3,3-trifluoropropylsiloxane units increase the resistance of the copolymer to solubilization in liquid hydrocarbons such as automotive and aviation fuels.

The property that distinguishes the present organosiloxane homopolymers and copolymers from many of the known diorganopolysiloxanes is their thermal stability, as determined by thermogravimetric analysis. Homopolymers wherein X of the preceding general formula represents oxygen exhibits only a 10 percent weight loss at a temperature of 461° C. in helium, and a copolymer containing 20 mole percent of these repeating units and 80 mole percent of dimethylsiloxane units exhibits a weight loss of 10 percent at a temperature of 477° C. in helium. By comparison, dimethylpolysiloxanes typically exhibit a 10 percent weight loss at only 360° C. under the same conditions, and a 25–30 percent weight loss at 460° C.

Methods for preparing 2,5-disilyl furans and pyrroles are known in the art, and typically involve reaction of the corresponding heterocyclic compound with an organolithium compound to replace the hydrogen atom on one or both of the cyclic carbon atoms immediately adjacent to the hetero atom. Each mole of the resultant metalated derivative is then reacted with one or two moles of diorganohalosilane of the formula SiHR2X, where X represents a halogen atom, to replace the metal with a —SiR2H substituent. The silicon-bonded hydrogen atom can be converted to a number of other reactive groups using known chemical reactions. For example, the reaction of solubilized 2,5-dimethylhydrosilyl-furan with a buffered aqueous solution containing a mixture of sodium hydroxide and sodium phosphate (pH=6.9) in the presence of a platinum-containing catalyst will produce a nearly quantitative yield of the corresponding silanol which is, in turn, condensed either alone or in the presence of one or more diorganopolysiloxanes to prepare the organosiloxane copolymers of this invention.

The following examples describe preferred embodiments of the novel organosiloxane monomers and polymers of this invention and methods for preparing these materials, and should not be interpreted as limiting the scope of the present invention as defined in the accompanying claims. Unless indicated to the contrary, all parts and percentages in the examples are by weight and viscosities were measured at 25° C.

EXAMPLE 1

This example describes the preparation and polymerization of 2,5-bis(dimethylhydroxysilyl)furan. The resultant polymer is within the scope of the present invention.

A 1 liter-capacity 3-necked glass reactor equipped with a condenser, addition funnel, thermometer, magnetic stirring bar, argon inlet and a bubbler outlet was flushed with argon for one hour. The reactor was then charged with 200 cc. of diethyl ether which had been dried by distillation from calcium hydride (CaH2) and 27.9 g. (0.410 mol) of furan. The reactor was cooled in an bath containing isopropanol and solid carbon dioxide, after which t-butyl lithium (0.841 mol) was dripped into the reaction mixture during a two hour period. The reaction mixture, which contained the furanyl dianion (I), was then warmed to room temperature and stirred 24 hours.

Dimethylchlorosilane, which had previously been dried by distillation from CaH2, (91.6 cc, 0.841 mol) and 100 cc of diethyl ether were placed in a 2 liter-capacity round bottom glass reactor equipped as described in the immediately preceding paragraph of this example, but without an addition funnel. The contents of the reactor were cooled in an isopropanol/solid CO2 bath and the reaction mixture containing the furanyl dianion (I) was added over a 3 hour period through a double-tipped needle. The resultant mixture was then warmed to room temperature and stirred for 24 hours.

The reaction mixture was then cooled in an ice bath while water was slowly added to dissolve the lithium chloride by-product. After removing the water layer the ether layer was washed with water and treated with a conventional drying agent to remove traces of water. The ether was then removed under reduced pressure to yield 49.0 g (65% of calculated yield) of 2,5-bis(dimethyhydrolsilyl)furan, (II, b.p. 100°–3° C. @ 60 mm Hg).

The nuclear magnetic resonance (NMR) spectrum of the reaction product in deuterochloroform was consistent with Formula 8 and exhibited peaks corresponding to the following chemical shifts: 0.33 (doublet, 6H, J=4 Hz), 4.43 (heptet, 1H, J=4 Hz) and 6.61 (singlet, 1H).

The infra-red spectrum of the neat raction product exhibited absorption maxima at 2950, 2110 (Si-H), 1250, 940, 890–850 (broad), 830 and 765 cm$^{-1}$.

In formula 8 Me represents methyl and Q represents 2,5-furyl.

A quantitative conversion of II to the corresponding disilanol (III) where the silicon-bonded hydrogen atoms of Formula 8 are replaced by hydroxyl groups was achieved by adding 0.5 percent by weight of palladium on carbon as a catalyst to a solution containing 48 g of II in 60 cc of dioxane and 330 cc of an aqueous buffer solution (pH=6.9) containing sodium dihydrogen phosphate and sodium hydroxide. The reaction was complete in 3 days at room temperature. The disilanol, III, was recrystallized from a toluene/hexane mixture to yield a material melting from 64.5–65.5 degrees C.

The NMR spectrum of the disilanol in deuterochloroform corresponded to the structure of III and exhibited peaks corresponding to the following chemical shifts: 0.40 (singlet, 6H), 3.07 (broad, 1H) and 6.62 (singlet, 1H).

The infra-red spectrum of the disilanol exhibited the following absorption maxima: 3650–3000 (broad, Si-OH), 2980, 1265, 935, 900–860 (broad) 830 and 790 cm$^{-1}$.

The homopolymerization of disilanol III was achieved by heating 5.00 g (0.023 mol) of III in the presence of 0.2 g of a 50% solution 2-ethylhexoate-n-hexylamine in hexane as the polymerization catalyst and 20 g of toluene in a glass reactor equipped with a Dean-Stark trap and reflux condenser. The mixture was heated at the boiling point for 5½ hours, at which time no additional water collected in the Dean-Stark trap. The reaction mixture was then washed with water to remove the condensation catalyst and the toluene was then removed under reduced pressure to yield a viscous oil that was soluble in hexane, methylene chloride, chloroform, tetrahydrofuran and toluene.

The NMR spectrum of a solution of the oil in deuterochloroform was consistent with the homopolymer (IV) of III and exhibited peaks corresponding to the following chemical shifts: 0.32 (singlet, 6H) and 6.47 (singlet, 1H).

The infra-red spectrum of IV exhibited the following absorption maxima: 2955, 1250, 1100–1020 (broad), 920, 820, and 785 cm$^{-1}$.

Molecular weight analysis by gel permeation chromatography (GPC) using dual infra-red (polydimethylsiloxane standard) and ultraviolet (polystyrene standard) detectors yielded the molecular weight data shown in Table I.

TABLE I

|  | Ultra-violet | Infra-red |
|---|---|---|
| Mw | 96,516 | 77,559 |
| Mn | 54,348 | 40,455 |
| Dispersity | 1.766 | 1.917 |
| Mz | 150,237 | 141,656 |

Thermal gravimetric analyses of III from room temperature to 1,000° C. revealed 10% weight losses occurring at 441° C. and 461° C. in air and helium, respectively.

The glass transition temperature (Tg) of the homopolymer, determined using a differential scanning calorimeter, was −53° C.

EXAMPLE 2

This example describes the preparation of a copolymer derived from a dimethylpolysiloxane and the disilanol (III) prepared as described in Example 1.

A 200 cc-capacity glass reactor equipped with Dean-Stark trap and magnetic stirring bar was charged with 7.0 g (0.032 mol) of III, 8.9 g (3.4 mmol) of a silanol-terminated dimethylpolysiloxane with a degree of polymerization of 35, about 45 cc of toluene and 0.149 g of a 50% solution of 2-ethylhexoate-n-hexylamine in hexane as the polymerization catalyst. The mixture was heated at the boiling point for 18 hours to remove the by-product water by azeotropic distillation. The catalyst was then removed by extraction with water, following which the reaction mixture was dried over anhydrous calcium sulfate and concentrated under reduced pressure to yield the copolymer (V) as a colorless viscous oil.

The copolymer was soluble in hexane, methylene chloride, chloroform, tetrahydrofuran and toluene. The NMR spectrum of the oil dissolved in deuterochloroform confirmed the identity of the copolymer and exhibited peaks corresponding to the following chemical shifts: 0.09 (singlet, 12H), 0.29 (singlet, 6H) and 6.52 (singlet, 1H).

The infra-red spectrum of the copolymer exhibited the following absorption maxima: 2940, 1250, 1130-1000 (broad), and 840-760 (broad) cm$^{-1}$.

GPC molecular weight data for the copolymer were obtained as described in Example 1 and are recorded in Table II.

TABLE II

|  | Ultra-violet | Infra-red |
|---|---|---|
| Mw | 72,635 | 68,115 |
| Mn | 36,771 | 33,193 |
| Dispersity | 1.975 | 2.052 |
| Mz | 119,394 | 119,320 |

Thermal gravimetric analysis of V in air and helium from room temperature to 1,000° C. revealed that the copolymer lost ten percent of its initial weight at 445° C. and 477° C., respectively. Analysis of the copolymer using differential scanning calorimetry indicated a Tg at −120° C.

EXAMPLE 3

This example describes the preparation of 2,5-bis[3,3,3-trifluoropropyl(methyl)(hydroxy)silyl]furan, the homopolymerization and copolymerization of this compound.

A 2 liter-capacity, 3-necked glass reactor equipped with a condenser, addition funnel, thermometer, magnetic stirring bar, argon inlet and a bubbler outlet was flushed with argon for 15 min. The reactor was charged with 400 cc of diethyl ether that had been freshly distilled from calcium hydride and 37.44 g (0.55 mol) of furan. The reactor was then cooled to 0° C. in an ice bath, at which time t-butyllithium (1.15 mol) was added dropwise over a two hour period. The reaction mixture, which contained the furanyl dianion (I), was warmed to room temperature and stirred for 24 hours.

A glass reactor equipped as described in the preceding paragraph of this example, but without the addition funnel was charged with 204 g. (1.15 mole) of 3,3,3-trifluoropropyl methylsilane (distilled from calcium hydride) and 300 cc of diethylether. This mixture was cooled to −60° C. using an isopropanol/dry ice bath. The reaction mixture containing I was then added through a double tipped needle over a 3 hour period, keeping the temperature below −25° C. The resultant mixture was then warmed to room temperature and stirred for 24 hours, following which it was cooled in an ice bath while water was slowly added to react with any unreacted anions and chlorosilanes as well as dissolve the lithium chloride by-product.

The 2,5-bis[3,3,3-trifluoropropyl(methyl)silyl]furan (VI) was isolated by removing off the water layer and washing the ether layer with water, treating the ether layer with a drying agent to remove traces of water and then evaporating the ether under reduced pressure. This procedure yielded 180 g of 2,5-bis[3,3,3-trifluoropropyl(methyl)silyl]furan (VI) as a 90% pure product. A portion of the product was distilled (100° C. at 0.5 torr) to obtain samples for spectral analyses. The remainder was polymerized as described hereinafter.

The NMR spectrum of a solution of VI in deuterochloroform was consistent with the expected 2,5-bis[3,3,3-trifluoropropyl(methyl)silyl]furan and exhibited peaks corresponding to the following chemical shifts: 0.40 (doublet, 3H, J=4 Hz), 0.75-1.25 (multiplet, 2H), 1.80-2.38 (multiplet, 2H), 4.33 (quadruplet, 1H, J=4 Hz), and 6.60 (singlet, 1H).

The IR spectrum of the neat reaction product exhibited the following absorption maxima: 2960-2780 (broad), 2120 (Si-H), 1255, 1290, 1110, 1130-1090 (broad), 1055, 915, 870, 835 and 810 cm$^{-1}$.

A glass reactor was charged with 180 g of VI, 290 cc of dioxane, 10 cc of 0.1N NaOH/NaH$_2$PO$_4$ buffer solution and 1.0 g of 5% palladium on powdered carbon. The resulting mixture was stirred for 3 days at room temperature while the course of the reaction was followed by noting the disappearance of the IR absorption maximum corresponding to silicon-bonded hydrogen.

The reaction mixture was filtered, washed with distilled water, dried and concentrated under reduced pressure to yield 185 g of the corresponding disilanol, VII.

The NMR spectrum of a solution of VII in deuterochloroform confirmed its identity, and exhibited peaks corresponding to the following chemical shifts: 0.34 (singlet, 6H), 0.7-1.32 (multiplet, 2H), 1.85-2.25 (multiplet, 2H) 3.86 (broad singlet, 1H), and 6.50 (singlet, 1H).

The infra-red spectrum of neat VII exhibited the following absorption maxima: 3500-3000 (broad), 2950-2890 (broad), 1450, 1360, 1310, 1260, 1200, 1140–1000 (broad, multiplet), 920, 890, 850 (broad), and 790 cm$^{-1}$.

A hydroxyl terminated methyl-3,3,3-trifluoropropylsiloxane/methylvinylsiloxane copolymer (VIII) containing 0.3 wt. % vinyl was prepared by heating a mixture of 110 g of HO[CF$_3$CH$_2$CH$_2$(CH$_3$)SiO]$_{4-7}$H and 2 g (0.0126 mol) of bis-(dimethylamino)methylvinylsilane under an inert atmosphere at 40° C. for 24 hours and concentrating the resultant mixture under reduced pressure.

A glass reactor was charged with 70.0 g (0.184 mol) of disilanol VII, 14.6 g of copolymer VIII and 30 cc of toluene, at which time 1.7 g of a 50% solution of 2-ethylhexoate-n-hexylamine in hexane were added as a silanol condensation catalyst. The mixture was heated at the boiling point for 8 hours while the by-product water was removed by azeotropic distillation. The catalyt was removed by washing with water, after which the organic layer was dried and solvent evaporated under reduced pressure to yield a light brown oil that was soluble in organic solvents.

The NMR spectrum of a solution of the oil in deuterochloroform was consistent with the expected terpolymer IX, and exhibited peaks corresponding to the following chemical shifts: 0.17 (broad singlet, 3H), 0.35 (broad singlet, 12H), 0.5–1.2 (multiplet, 10H), 1.80–2.20 (multiplet, 10H), and 6.53 (broad singlet, 4H).

The weight average molecular weight of the terpolymer, determined by GPC was 19,670 with a polydispersity of 2.0. The Tg of IX was −57° C., determined using differential scanning calorimetry.

The terpolymer IX was crosslinked by reacting 0.50 g of the copolymer, 0.50 g of an organohydrogenpolysiloxane containing 0.6 wt. percent of silicon-bonded hydrogen and 20 microliters of a 50 percent by weight solution of a platinum-containing hydrosilation catalyst prepared by reacting 30 parts of hexachloroplatinic acid with 16.5 parts of a dimethylvinylsiloxy terminated poly(methyl-3,3,3-trifluoropropyl)siloxane containing an average of 30 methyl-3,3,3-trifluoropropyl-siloxane units per molecule. Heating this mixture for 1 hour at 150° C. yielded a solid elastomer exhibiting a Tg of −52° C. This material exhibited a 19% weight gain after soaking in JP-4 jet fuel for 24 hours at room temperature and did not appear to have been degraded by contact with the fuel.

EXAMPLE 4

This example describes the preparation and polymerization of 2,5-bis(dimethylhydroxysilyl)-1-methylpyrrole.

A dry glass reactor equipped with a magnetic stirring bar, spiral condenser with an outlet to a gas bubbler, an addition funnel fitted with an argon inlet and a thermometer was charged with 29.53 g (0.364 mol) of 1-methylpyrrole and 300 cc of diethylether that had been freshly distilled from calcium hydride. The resultant mixture was cooled in an ice bath, at which time 450 cc of 1.7M t-butyllithium (0.765 mol) were added to the addition funnel via a double tipped needle.

The contents of the addition funnel was then added dropwise to the stirred reaction mixture over a 3 hour period. Following completion of the addition the reaction mixture containing the pyrrole dianion (X) was allowed to warm to room temperature and was stirred for an additional 18 hours, at which time the reaction mixture was cooled to 20° and a solution of 81.0 g (0.856 mol) in 200 cc of diethyl ether was added. After stirring for 2 days at room temperature the reaction mixture was cooled to 10° C. and hydrolyzed by the addition of about 400 cc of distilled water. The ether phase was separated, washed with water, dried and concentrated under reduced pressure. Distillation of the resulting oil at a temperature of 78°–84° C. and under a pressure of 0.5 mm of mercury yielded 30.2 g (42% yield) of a clear, colorless liquid. The presence of 2,5-bis(dimethylsilyl)-1-methylpyrrole (XI) was confirmed by the nuclear magnetic resonance spectrum of the reaction product as a solution in deuterochloroform, which exhibited peaks corresponding to the following chemical shifts: 0.33 (doublet, J=4 Hz, 12H), 3.70 (singlet, 3H), 4.42 (heptet, J=4 Hz, 2H), and 6.35 (singlet, 2H).

The IR spectrum of the neat reaction product exhibited the following absorption maxima, expressed in cm$^{-1}$: 3080, 2950, 2100, 1490, 1430, 1350, 1335, 1280, 1250, 1180, 1070, 1025, 920, 900–840 (broad), 830, 750, 740 and 660.

The conversion of the dihydride XI using an aqueous buffer as described in the preceding examples did not yield the desired diol. An alternate procedure was therefore used.

To 25 cc of a boiling absolute ethanol solution containing a small piece of metallic sodium was added 3.9 g of XI and heating was continued for an additional 3 hours. The absence of silicon-bonded hydrogen was noted in the IR spectrum. The yellow pyrrole compound turned orange during the reaction.

The reaction mixture was then poured into a flask containing 2.3 g of NaOH dissolved in 15.5 cc of distilled water and allowed to remain at room temperature for 20 minutes, at which time it was poured into a slurry of ice and water containing 20.6 g of NaH$_2$PO$_4$. The precipitate which formed was filtered and washed with cold water to yield 4 g of the diol XII which melted to an oil at room temperature.

The presence of 2,5-bis(dimethylhydroxysilyl)-1-methylpyrrole (XII) was confirmed by the NMR spectrum of a solution of this compound in deuterochloroform, which exhibited peaks corresponding to the following chemical shifts: 0.44 (singlet, 12H), 2.29 (singlet, 2H), 3.73 (singlet, 3H), and 6.23 (singlet, 2H).

The IR spectrum of the neat reaction product exhibited the following absorption maxima, expressed in cm$^{-1}$: 3400–3180 (broad), 2940, 1450–1300 (broad multiplet), 1180, 1045, 950 (sharp), 910, and 820.

A small amount of the reaction product XII was polymerized as described in the preceding Example 1 for the corresponding furan derivative. The resultant oil was shown to be free of silicon-bonded hydroxyl groups by IR spectroscopy.

That which is claimed is:

1. An organopolysiloxane comprising repeating units of the formula

where each of the substituents represented by R is individually selected from hydrocarbyl, halogenated hydrocarbyl or mixtures thereof, and Q represents 2,5-furyldiyl or 2,5-pyrrylidyl.

2. An organopolysiloxane according to claim 1 where each R is individually selected from methyl, phenyl, or 3,3,3-trifluoropropyl.

3. An organopolysiloxane according to claim 2 where the terminal silicon atoms in each molecule are bonded to an atom or monovalent group that reacts to effect curing of said organopolysiloxane.

4. An organopolysiloxane according to claim 3 where said atom is hydrogen or halogen and said group is hydroxyl or an alkenyl radical.

5. An organopolysiloxane according to claim 4 where said alkenyl radical is vinyl.

6. An organopolysiloxane according to claim 2 wherein at least 50 percent of the R radicals are methyl.

7. An organopolysiloxane according to claim 2 where the terminal unit is a silicon-bonded 2-furyl or 2-pyrryl radical.

8. An organopolysiloxane according to claim 1 where up to 50 mole percent of the repeating units correspond to the formula

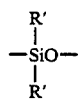

where R' is selected from the same group as R.

9. An organopolysiloxane according to claim 8 where at least 50 mole percent of the R' radicals are methyl and any remainder are 3,3,3-trifluoropropyl.

10. An organopolysiloxane according to claim 9 where the terminal silicon atoms are bonded to an atom or monovalent group that reacts to effect curing of said organopolysiloxane.

11. An organopolysiloxane according to claim 10 where said atom is hydrogen or halogen and said group is hydroxyl or an alkenyl radical.

12. An organopolysiloxane according to claim 8 where the terminal unit is a silicon-bonded 2-furyl or 2-pyrryl radical.

* * * * *